(No Model.)
E. T. MASON & M. H. MOSKOVITS.
ART OF MAKING ARTIFICIAL HONEY CELLS AND COMBS.
No. 481,578. Patented Aug. 30, 1892.
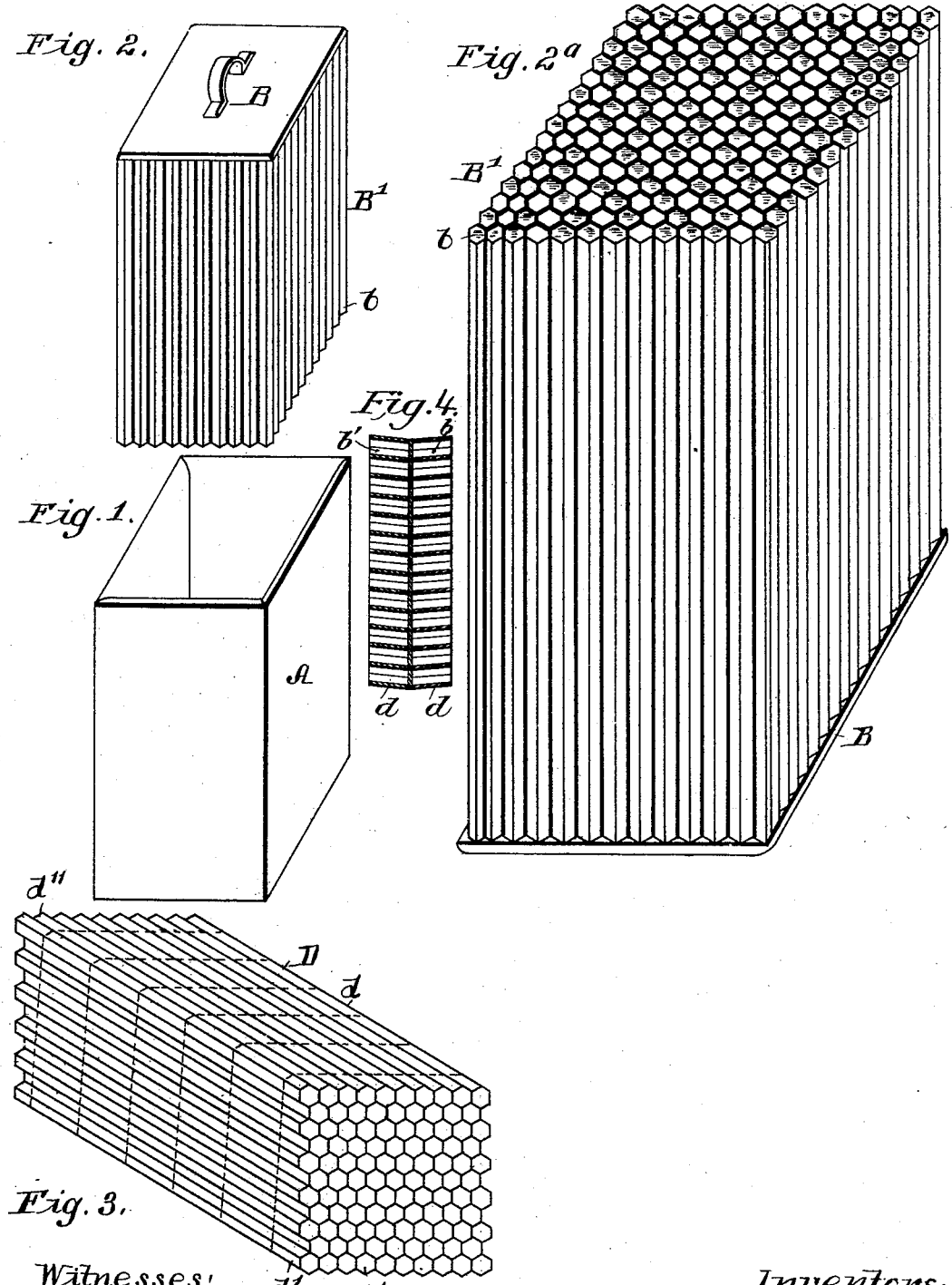

UNITED STATES PATENT OFFICE.

EDGAR T. MASON AND MAXIMILIAN H. MOSKOVITS, OF KANSAS CITY, MISSOURI.

ART OF MAKING ARTIFICIAL HONEY CELLS AND COMBS.

SPECIFICATION forming part of Letters Patent No. 481,578, dated August 30, 1892.

Application filed October 30, 1891. Serial No. 410,336. (No model.)

*To all whom it may concern:*

Be it known that we, EDGAR T. MASON and MAXIMILIAN H. MOSKOVITS, citizens of the United States, residing at Kansas City, in the county of Jackson and State of Missouri, have invented certain new and useful Improvements in the Art of Making Artificial Honey Cells and Combs; and we do hereby declare that the following is a full, clear, and exact description of the same, reference being had to the accompanying drawings, forming a part of this specification.

The object of our invention is to produce an artificial cellular wax mass of an indefinite length and from the same material used by the bee in forming natural combs, and which will retain its form when subjected to heat and in transportation, and may be divided into sections as needed and the sections united together, so as to form an artificial comb and retain the honey deposited therein.

In the drawings, Figure 1 is a view in perspective of a compartment or box holding the melted wax. Fig. 2 is a detail view of the core-supporting plate, showing the series of cell-forming cores drawn from the melted wax. Fig. 2$^a$ is an inverted view of Fig. 2. Fig. 3 is a view in perspective of a cellular mass of wax formed by the cores and showing in dotted lines the manner of dividing the mass into sections. Fig. 4 is a view of the complete artificial honey-comb in vertical section.

In carrying out our invention, let A represent the receptacle for holding melted wax, consisting of a rectangular-shaped box of the requisite depth and width and open at the top. We then take the ordinary wax produced by the bee and make it plastic with heat and fill the receptacle A with the wax. A similar vessel is also made and filled with melted lard. We then make a flat plate B of the exact size to fit within the sides of the box A. To the under side of plate A are rigidly attached the cell-forming cores B'. Each core $b$ consists of a metallic pin made of the depth of the box A, and the sides of the pin are hexagonal in form, corresponding to the form of a cell in the natural honey-comb made by the bee. The upper end of the core $b$ is attached rigidly to the under side of the plate B, and a series of like cores covering the plate B are attached to said plate in a like manner and placed near each other, so as to leave a space around or on all sides between one of said pins and an adjoining pin or core. The plate B, with its series of depending cores, is first dipped into the vessel containing melted lard and then into the vessel A, containing the melted wax, and immediately withdrawn from the wax and immersed in cold water, and upon being taken out of the water the plate B is shaken slightly and the cellular mass of wax D is taken from the plate B and the cores B'. The cellular block of wax thus formed is of a considerable length and the cells $b'$ are separated from each other by a thin film of wax. The cellular mass D' is then cut in a transverse direction into separate parts by means of a knife or heated wire, and in separating the parts the knife is inclined at an angle to the sides of the cellular wax mass and the lines of separation are made at an angle to the said sides. The sections $d$ of the cellular wax mass form one side of the artificial honey-comb. The end sections $d'$, which are rectangular in thickness, are subjected to heat and melted over. Two sections $d\ d$, cut as described from the cellular mass D, are then taken for the making of the complete artificial honey-comb and reversed in position. One section $d$ is subjected upon one side to heat, so as to make the edges of the cells adhesive. We then take said section $d$ of the cellular mass of wax, and upon one side over the cells we spread in a thin sheet plastic wax, which closes the cells at one end. We then take the other section $d$, subject one side to heat and make it adhere flatwise to the first section and to the side of said section upon which the cells are closed, this being done immediately after spreading the thin sheet of wax to close the wax cells, thus forming the complete artificial honey-comb. In our process the sheet of wax between the sections of the artificial comb is made very thin, and therefore does not weigh down the artificial cells.

In reversing the sections of the block A the cells $d'$, which are inclined downwardly, are made to incline in the same direction toward the ends of the cells closed by the intermediate plastic wax and thus retain the honey within the cells *b'* when filled by the bee. We are thus enabled to form an artificial honey-comb which overcomes the hitherto objectionable features in their use. Before forming the artificial honey-comb the cellular mass may be transported without injury and in any desired length and the complete comb made as needed in the manner described.

Having fully described our invention, what we now claim as new, and desire to secure by Letters Patent, is—

1. The improved method of making sections for artificial honey-combs, consisting in molding wax into a cellular mass of the desired length and width and then separating the artificial cellular mass transversely into parts of the required thickness.

2. The improved method of making sections of artificial honey-combs, consisting in molding wax into a cellular mass of the desired length and width and then separating the artificial cellular mass transversely into parts or sections upon a line at an angle of inclination to the sides of said mass, for the purpose described.

3. The improved method of making artificial honey-combs, consisting in molding wax into a cellular mass of the desired length and width and then separating the cellular mass transversely into parts of the requisite thickness, then making the edges of the cells on one side of one of said parts adhesive and spreading in a thin sheet plastic wax over said side and cells and then taking another part of the cellular mass and making the edges of the cells on one side of said part adhesive and uniting them to the other part of the cellular mass and to the side of said part over which the plastic wax is spread.

EDGAR T. MASON.
MAXIMILIAN H. MOSKOVITS.

Witnesses to the signature of Edgar T. Mason:
S. L. C. HASSON,
H. K. TOMLINSON.

Witnesses to the signature of Maximilian H. Moskovits:
S. L. C. HASSON,
R. E. KIRTLEY.